(12) United States Patent
Vankayala et al.

(10) Patent No.: US 11,671,971 B2
(45) Date of Patent: Jun. 6, 2023

(54) METHOD AND SYSTEM FOR ALLOCATING RESOURCE IN WIRELESS COMMUNICATION NETWORK

(71) Applicant: Samsung Electronics Co., Ltd., Suwon-si (KR)

(72) Inventors: Satya Kumar Vankayala, Bengaluru (IN); Akhil Shukla, Bengaluru (IN); Pankaj Bhimrao Thorat, Bengaluru (IN); Satya Venkata Uma Kishore Godavarti, Bengaluru (IN); Tummala Seshu, Bengaluru (IN); Vishal Devinder Karira, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 17/111,383

(22) Filed: Dec. 3, 2020

(65) Prior Publication Data

US 2021/0168841 A1 Jun. 3, 2021

(30) Foreign Application Priority Data

Dec. 3, 2019 (IN) .............................. 201941049710
Nov. 26, 2020 (IN) .............................. 201941049710

(51) Int. Cl.
*H04W 72/21* (2023.01)
*H04W 72/51* (2023.01)
*H04W 72/52* (2023.01)

(52) U.S. Cl.
CPC ........... *H04W 72/21* (2023.01); *H04W 72/51* (2023.01); *H04W 72/52* (2023.01)

(58) Field of Classification Search
None
See application file for complete search history.

(56) References Cited

U.S. PATENT DOCUMENTS

| | | | |
|---|---|---|---|
| 8,948,082 B2* | 2/2015 | Eriksson | H04W 72/1284 370/348 |
| 10,098,122 B2* | 10/2018 | Wang | H04W 72/0473 |
| 10,313,920 B1* | 6/2019 | Manchanda | H04W 72/1284 |
| 11,375,527 B1* | 6/2022 | Eyuboglu | H04B 7/15528 |
| 2008/0225693 A1* | 9/2008 | Zhang | H04L 5/023 370/329 |
| 2013/0016615 A1* | 1/2013 | Shi | H04W 72/1284 370/241 |
| 2013/0028223 A1* | 1/2013 | Kim | H04W 72/0446 370/329 |

(Continued)

*Primary Examiner* — Nicholas Sloms

(57) ABSTRACT

The present disclosure discloses methods and systems for efficiently allocating grants for resource allocation based on BSR index. The method includes receiving by a Base-Station (BS) a Buffer Status Report (BSR) index value from a User Equipment (UE) along with buffer size corresponding to an Uplink (UL) data transmission request. Upon determining the buffer size corresponding to the received BSR index value to be greater than a predefined threshold value, resources to the UE is allocated corresponding to a maximum buffer size of (BSR index-n). Upon receiving UL data from the UE based on the allocated resources, resources to the UE are allocated subsequently using a predefined allocation mechanism until one of, detection of padding bits in the received UL data and on detecting maximum allocation of predefined number of allocation.

16 Claims, 15 Drawing Sheets

(56) References Cited

U.S. PATENT DOCUMENTS

| | | | |
|---|---|---|---|
| 2013/0100908 A1* | 4/2013 | Xu | H04W 72/0406 370/328 |
| 2013/0114445 A1* | 5/2013 | Wen | H04W 72/1252 370/252 |
| 2014/0141769 A1* | 5/2014 | Brisebois | H04W 4/021 455/437 |
| 2014/0295865 A1* | 10/2014 | Fantaye | H04W 52/0219 455/450 |
| 2016/0021646 A1 | 1/2016 | Hu et al. | |
| 2016/0285775 A1 | 9/2016 | Damnjanovic et al. | |
| 2017/0118766 A1* | 4/2017 | Baek | H04L 1/1887 |
| 2017/0238332 A1* | 8/2017 | Yi | H04W 72/10 370/329 |
| 2018/0270854 A1* | 9/2018 | Lee | H04W 72/0446 |
| 2018/0368023 A1 | 12/2018 | Hong et al. | |
| 2019/0082446 A1* | 3/2019 | Guo | H04W 72/1215 |
| 2019/0150025 A1* | 5/2019 | Ohta | H04W 88/08 370/329 |
| 2019/0230552 A1* | 7/2019 | Yu | H04W 72/1263 |
| 2019/0281493 A1* | 9/2019 | Li | H04W 28/0278 |
| 2020/0022134 A1* | 1/2020 | Ohta | H04W 72/0413 |
| 2020/0137785 A1* | 4/2020 | Deogun | H04W 28/0278 |
| 2020/0275308 A1* | 8/2020 | Liu | H04L 1/1825 |
| 2021/0022131 A1* | 1/2021 | Liu | H04W 72/085 |
| 2021/0076229 A1* | 3/2021 | Rost | H04Q 9/00 |
| 2022/0053507 A1* | 2/2022 | Li | H04L 1/1896 |

\* cited by examiner

METHOD AND SYSTEM FOR ALLOCATING RESOURCE IN WIRELESS COMMUNICATION NETWORK

CROSS-REFERENCE TO RELATED APPLICATIONS

This application claims priority under 35 U.S.C. § 119(e) to Indian Provisional Patent Application No. 201941049710 filed on Dec. 3, 2019 and Indian Patent Application No. 201941049710 filed on Nov. 26, 2020. The above-identified patent applications are hereby incorporated by reference in its entirety.

BACKGROUND

1. Field

The present disclosure generally relates to resource allocation in wireless networks, more particularly, but not exclusively to a method and system for efficiently allocating grants for resource allocation based on BSR index.

2. Description of Related Art

Wireless communication systems are widely deployed to provide various types of communication services such as, in terms of voice, data, and the like. These systems may be multiple-access systems capable of supporting communication with multiple users by sharing the available system resources (e.g., bandwidth and transmit power). Examples of such multiple-access systems include, Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems, 5th generation communication system and Orthogonal Frequency Division Multiple Access (OFDMA) systems.

In wireless communication specification/protocol, User Equipment (UE) reports only a BSR (Buffer Status Report) index corresponding buffer values that is between lower and higher bound of the buffer associated with the BSR index. The network generally allocates grant for BSR index in multiple steps based on padding reported in MAC CE.

SUMMARY

A method and system for efficiently allocating resource based on BSR index are provided. The method includes receiving by a Base-Station (BS) a Buffer Status Report (BSR) index value from a User Equipment (UE) along with buffer size corresponding to an Uplink (UL) data transmission request. The method includes determining the buffer size corresponding to the received BSR index value to be greater than a predefined threshold value and allocating resources to the UE corresponding to a maximum buffer size of an index (BSR index-n), where n is an integer number greater than or equal to "0". Upon receiving UL data from the UE based on the allocated resources, the method includes allocating resources to the UE subsequently using a predefined allocation mechanism until one of, detection of padding bits in the received UL data and on detecting maximum allocation of predefined number of allocation.

In an embodiment, the present disclosure may relate to a system configured in a base station for efficiently allocating resource based on BSR index. The system may include a processor and a memory communicatively coupled to the processor, where the memory stores processor executable instructions, which, on execution, may cause the grant allocation system to receive a Buffer Status Report (BSR) index value from a User Equipment (UE) along with buffer size corresponding to an Uplink (UL) data transmission request. The system determines the buffer size corresponding to the received BSR index value to be greater than a predefined threshold value and allocates resources to the UE corresponding to a maximum buffer size of an index (BSR index-n), where n is an integer number greater than or equal to 0. Upon receiving UL data from the UE based on the allocated resources, resources to the UE are allocated subsequently using a predefined allocation mechanism until one of, detection of padding bits in the received UL data and on detecting maximum allocation of predefined number of allocation.

In another embodiment, the present disclosure may relate to a method for efficiently allocating resource based on BSR index. The method includes receiving a Buffer Status Report (BSR) index value from a User Equipment (UE) along with buffer size corresponding to an Uplink (UL) data transmission request. The buffer size corresponding to the received BSR index value is compared with a predefined threshold value. on determining the buffer size to be greater than a predefined threshold value, the method includes allocating resources to the UE corresponding to maximum buffer size of ab index (BSR index-n), where n is an integer number greater than or equal to 0. The method includes receiving the UL data based on the allocated resources along with a BSR index value for remaining data in buffer. Further, the method includes repeatedly performing above steps until detecting one of, the buffer size corresponding to the requested BSR index value to be less than the predefined threshold value and on detecting maximum allocation of predefined number of allocations.

In another embodiment, the present disclosure may relate to a method for resource allocation based on BSR index. The method includes determining a Buffer Status Report (BSR) index value for Uplink (UL) data to be transmitted using a predefined buffer index table. The method includes transmitting the determined BSR index value along with buffer size corresponding to the Uplink (UL) data to the BS. Further, the method includes receiving an allocated resource corresponding to maximum buffer size of an index (BSR index-n), where n is an integer number greater than or equal to 0. Thereafter, the method includes transmitting the UL data along with a BSR index value for remaining UL data iteratively to the BS, until the transmission the UL data is completed.

In an embodiment, the present disclosure may relate to a User Equipment (UE) for resource allocation based on BSR index. The UE may include a processor and a memory communicatively coupled to the processor, where the memory stores processor executable instructions, which, on execution, may cause the UE to determine a Buffer Status Report (BSR) index value for Uplink (UL) data to be transmitted using a predefined buffer index table. The UE transmits the determined BSR index value along with buffer size corresponding to the Uplink (UL) data to the BS. The UE receives an allocated resource corresponding to maximum buffer size of an index (BSR index-n), where n is an integer number and greater than or equal to 0. Thereafter, the UE transmits the UL data along with a BSR index value for remaining UL data iteratively to the BS, until the transmission the UL data is completed.

In another embodiment, the present disclosure may relate to a method for efficiently allocating resource based on BSR index. The method includes receiving a Buffer Status Report (BSR) index value from a User Equipment (UE) along with buffer size corresponding to an Uplink (UL) data transmission request. Further, the method includes estimating an optimal resource grant for the UE for the requested BSR index based on at least one of UE parameters and network parameters using a pretrained machine learning model.

The foregoing summary is illustrative only and is not intended to be in any way limiting. In addition to the illustrative aspects, embodiments, and features described above, further aspects, embodiments, and features will become apparent by reference to the drawings and the following detailed description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figure 1A:
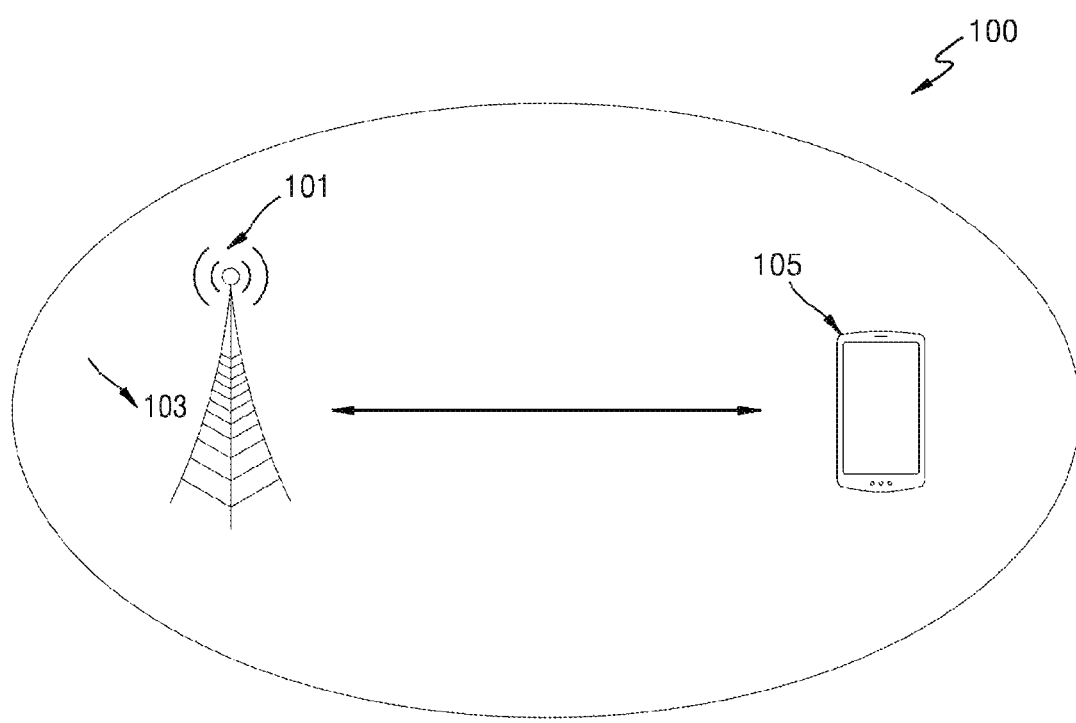
FIG. 1A illustrates an exemplary environment for efficiently allocating resource based on BSR index in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprise", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Wireless resource allocation and buffer status reporting may be based on packet size, and a base station may allocate resources for communications with the UE to provide resources for an integer number of packets. For downlink communications from a base station to a UE, a scheduler may allocate resources to transmit an integer number of packets, based on packet size and number of packets to be transmitted. For uplink communications, a UE may transmit a buffer status report (BSR) that indicates packet size and number of packets to be transmitted. The base station may allocate uplink resources to the UE that correspond to an integer number of packets. Resources may be allocated that have a variable length transmission time interval (TTI) that may be adjusted, alone or in combination with other resources (e.g., frequency resources), to provide for transmission of an integer number of packets.

Conventionally, there exist two types of data structure. One is short BSR and the other is long BSR. With short BSR, UE can inform the amount of data in UL buffer only for one specific Logical Channel Group (LCG). That is the reason for "LCG ID" field at the beginning of short BSR. With long BSR, the UE may inform the UL buffer information for all LCG. That is the reason for no specific LCG ID field in long BSR, but they have multiple 'Buffer Size' field, each of which represent one LCG. Similar issues have been noticed for other BSR reporting methods as well.

The MAC specification defines the UE to report only BSR index and the UE does not need to report actual buffer size. In case of higher BSR indexes, the difference in number of bytes between lower and upper bound are considerably significant. In other words, as the number of BSR index increases, as the gap between lower and upper bound according to the BSR index increases. Currently, the network may err to fall on the higher bound of BSR index without considering the actual buffer size relative to the higher bound. The excess UL grant allocated is filled with padding in case of less usable data. In other words, in case that the amount of allocated UL resource is larger than the amount of the UL data to be uplinked from the UE, the UE fills data with padding bits. The higher number of padding leads to wastage of radio resources of the base station and transmission power for the UE. For instance, consider a case when a UE reports the BSR index in a time slot "t", and resource allocation is performed in time slot "n". Between the time slot t and n, a Base station (BS) can predict expected data for the UE and allocate the resource allocation efficiently.

Hence, there is a need of a system and method for resource allocation, wherein the UE may report BSR index based on the buffer occupancy size and network which may allocate grant for upper bound of BSR index.

Embodiments of the present disclosure relates to a method and a system for efficiently allocating grants for resource allocation based on Buffer Status Report (BSR) index. Typically, a BSR is defined as a MAC Control Element (CE) from a User Equipment (UE) to a network carrying information on how much data in UE buffer is to be transmitted. Currently, the UE reports only a BSR index corresponding buffer values that is between lower and higher bound of the buffer associated with the index. However, the network tends to determine the higher bound since exact buffer size is never reported. If the actual buffer size is closer to lower bound, it may lead to resource under-utilization and higher padding bits since the Uplink (UL) allocation is closer to upper bound of BSR index. The MAC specification defines the UE to report only BSR index and not the buffer size. In case of higher BSR indexes, the difference in number of bytes between lower and upper bound are considerably significant. The network may determine the higher bound of BSR index without considering the actual buffer size relative to the higher bound. The excess UL grant allocated is filled with padding in case of less usable data. This causes under-utilization and wastage of allocated radio resources such as, bandwidth resource.

The present disclosure in such condition allocates resources efficiently by allocating resources to the UE corresponding to a maximum buffer size of an index (BSR index-n), where n is an integer number greater than or equal to 0. The resources are allocated after determining a buffer size corresponding to the received BSR index value from the UE to be greater than a predefined threshold value. Thus, upon receiving UL data from the UE based on the allocated resources, the present disclosure allocates resources to the UE subsequently using a predefined allocation mechanism until one of, detection of padding bits in the received UL data and on detecting maximum allocation of predefined number of allocation. Therefore, the UE is allocated resource grants in multiple sequence and not in single UL allocation, especially for BSR of higher sizes. As a result, the present disclosure helps in efficiently allocating and scheduling resource grant based on BSR index value to minimize byte padding. In addition, the present disclosure allows network to save on resource and serve more users by differing BSR grant resources to UE in multiple iterations.

FIG. 1A illustrates an exemplary environment for efficiently allocating resource based on BSR index in accordance with some embodiments of the present disclosure.

As shown in FIG. 1A, an environment 100 relates to wireless communication and includes a Base station (BS) 101 communicatively connected to a User Equipment (UE) 105. The BS 101 is a fixed point of communication for the UE 105 on a carrier network for providing network services. The wireless communication may include different generations such as, $2^{nd}$ Generation (2G), 3rd Generation (3G), Long Term Evolution (LTE), $5^{th}$ Generation (5G), 6th Generation (6G) and non-3gpp technologies.

The BS 101 is configured with a grant allocation system 103 for efficiently allocating grants for resource allocation based on BSR index. The BS 101 is connected to Cloud Random Access Networks (RAN) (not shown explicitly in FIG. 1A), which includes multiple stand-alone base stations (BTS). In an embodiment, backend layer processing may be performed in the cloud RAN.

In one embodiment, the grant allocation system 103 may be configured as a separate entity to the BS 101. In another embodiment, the grant allocation system 103 may be configured in associated with other entities in the BS 101 in order to efficiently allocate grants for resource allocation. Each BTS covers a small area, whereas a group BTS provides coverage over a continuous area. Each BTS processes and transmits its own signal to and from the UE 105, and forwards data to and from the UE 105.

Figure 1B:
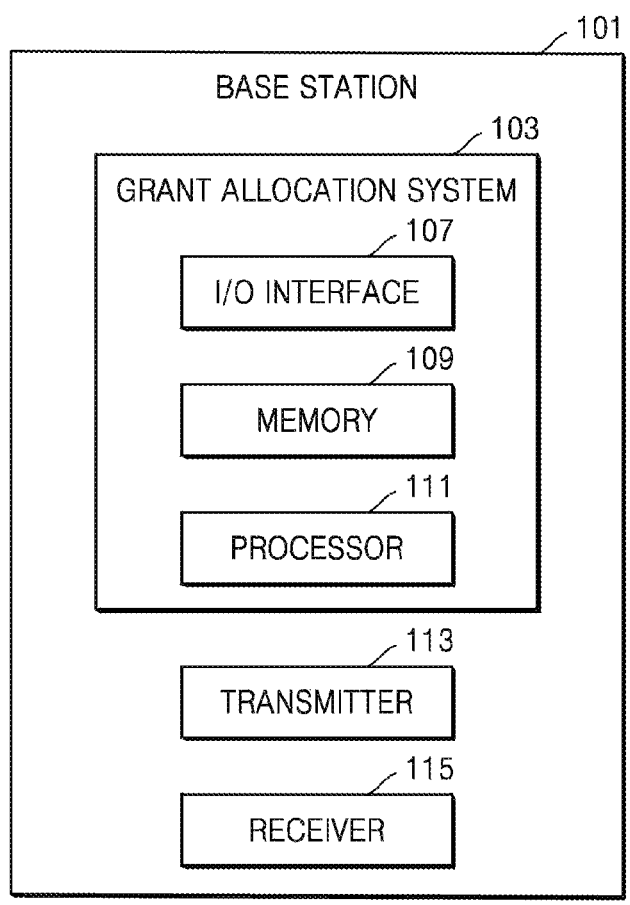
FIG. 1B illustrates an exemplary block diagram of a base station for efficiently allocating resource based on BSR index in accordance with some embodiments of the present disclosure.

FIG. 1B illustrates an exemplary block diagram of a base station for efficiently allocating resource based on BSR index in accordance with some embodiments of the present disclosure. As shown, the BS 101 includes the grant allocation system 103, a transmitter 113 and a receiver 115. The BS 101 may include any other component not shown explicitly in the FIG. 1B. The grant allocation system 103 may include an I/O interface 107, a memory 109, a processor 111. The I/O interface 107 may be configured to receive configurations and any UE related information from the transmitter 113. The configurations and UE related information received by the I/O interface 107 may be stored in the memory 109. The memory 109 may be communicatively coupled to the processor 111. The memory 109 may also store processor instructions which may cause the processor 111 to execute the instructions for efficiently allocating grants for resource allocation based on BSR index.

During uplink data transmission, the grant allocation system 103 may receive a Buffer Status Report (BSR) index value from the UE 105 along with a buffer size corresponding to an Uplink (UL) data transmission request. In an embodiment, BSR reporting procedure is used to provide the BS 101 with information about amount of data available for transmission in the UL buffers of the UE 105. The BSR is reported as an index value based on the buffer size. A buffer index table is a predefined table which may be used for determining the index value. The buffer index table is configured in the UE 105 for determining the BSR index value and the buffer index table is also known to the BS 101. As the number of BSR index value increases, the amount of the buffer size increases. For instance, the buffer index table may be predefined as following table 1. Assume that the number of bytes in the UE buffer is 800000 bytes. In case that the buffer index value is determined as "180", then 24928 bytes should be padded in uplink data.

TABLE 1

| BSR index | Buffer Size (bytes) |
|---|---|
| . . . | . . . |
| 178 | ≤727427 |
| 179 | ≤774645 |
| 180 | ≤824928 |
| 181 | ≤878475 |

Thus, according to the present disclosure, to reduce wastage of resource, upon receiving the UL data transmission request, the grant allocation system 103 may compare the buffer size corresponding to the received BSR index value with a predefined threshold value. The predefined threshold value refers to maximum buffer value corresponding to the received BSR index value (BSR-n). Based on comparison, when the BSR index value is determined as greater than the predefined threshold value, the grant allocation system 103 may allocate resources to the UE 105 such that the grant corresponds to a maximum buffer size of BSR index of (BSR index value-n), where "n" is an integer number greater than or equal to "0". In an embodiment, the value of "n" is decided by a scheduler in the BS 101 based on load condition in the BS 101 and UE and network conditions. For instance, when the load is light in the BS 101, the scheduler may decided the value of "n" as "0" with maximum allocation. On the other hand, when the BSR index value is determined as lesser than the predefined threshold value, the grant allocation system 103 may allocate the resources to the UE 105 corresponding to maximum buffer size of received BSR index value.

Once the grant allocation system 103 receives UL data from the UE 105 based on the allocated resources, the grant allocation system 103 may check for padding bits in the received UL data. In an embodiment, the UL data may be non-real time data. In case, the padding bites are not detected, the grant allocation system 103 may further allocates resources to the UE 105 subsequently using a predefined allocation mechanism. The subsequent resource allocation may take place until one of, detection of padding bits in the received UL data and detecting maximum allocation of predefined number of allocation. For example, consider if the allocated grant is for "25953 bits" and remaining bytes in UE to be transmitted is "25355". In such case, the UE 105 may transmit "25355 bits" of UL data along with "598 bits" as dummy bits, based on the difference between the allocated grant and remaining bytes. In another instance, assuming that the maximum number of allocating grant to UE 105 is "3 times", the grant allocation system 103 may further allocate resources to the UE 105 subsequently until the allocation reaches the maximum number of allocation, i.e., three times in this case.

The predefined allocation mechanism may include determining, upon receiving the UL data from the UE 105, the buffer size for allocation based on a ratio of difference between previously requested BSR index and allocated BSR index of (BSR index-n) and a predefined scaling value. In an embodiment, the predefined scaling value is an integer value. For example, the predefined scaling value is two. The same is represented by below equation 1:

$$\text{Max bytes of BSR index} - \text{Max bytes of(BSR index-} n)/(E \cdot I) \quad (1)$$

where, E=scaling value
I=iteration counter.

An example for the predefined allocation mechanism is explained subsequently in FIG. 3B.

In an embodiment, the present disclosure may include resource allocation for downlink transmission as well. In the downlink transmission, the BS 10 may allocate resources by considering load of the BS 101 and other neighbouring BS and UE wireless parameters and other transmission parameters. In an embodiment, system performance can be function of number of wireless parameters. Further, the present disclosure is extended for systems such as, Time Division Duplex (TDD), Frequency Division Duplex (FDD), Dynamic TDD systems and the like.

In another implementation, once the resource is allocated, the grant allocation system 103 may receive the UL data from the UE 105 along with a BSR index value for remaining data in buffer. In such cases, the UE 105 may transmit the UL data along with a signalling indicating BSR index value for remaining data. Thus, the UE 105 is configured for resource allocation based on BSR index. Based on the presence or absence of the signalling, the BS 101 may allocate the grant to the UE 105. That is, in absence of this signal from the UE 105, the grant allocation system 103 may use the predefined allocation mechanism for subsequent allocation. The UE 105 may include, but is not limited to, a laptop, a computer, a notebook, a smartphone, a tablet, and any other user computing devices. A person skilled in the art would understand that, any other devices, not mentioned explicitly, may also be used as the UE 105 in the present disclosure.

Figure 1C:
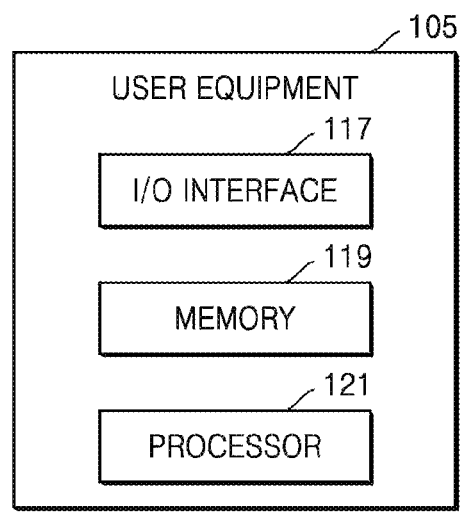
FIG. 1C illustrates an exemplary block diagram of a User Equipment (UE) for resource allocation based on BSR index in accordance with some embodiments of the present disclosure.

FIG. 1C illustrates an exemplary block diagram of a User Equipment (UE) for resource allocation based on BSR index in accordance with some embodiments of the present disclosure. As shown, the UE 105 may include an I/O interface 117, a memory 119, a processor 121. The I/O interface 117 may be configured to receive resource allocation from the grant allocation system 103. The resource allocation received by the I/O interface 117 may be stored in the memory 119. The memory 119 may be communicatively coupled to the processor 121 of UE 105. The memory 119 may also store processor instructions. The UE 105 may determine the BSR index value for UL data to be transmitted using a predefined buffer index table. Particularly, the UE 105 receives the allocated resource corresponding to maximum buffer size of index value (BSR index-n) and transmits the UL data along with the BSR index value for remaining UL data iteratively until the transmission the UL data is completed.

In such case, upon receiving the UL data along with BSR index for remaining data, the grant allocation system 103 may repeatedly perform comparison of the the buffer size corresponding to the received BSR index value with the predefined threshold value, allocation of the resources and receiving of the UL data, until the grant allocation system 103 detects one of, the buffer size corresponding to the requested BSR index value to be less than the predefined threshold value and detecting maximum allocation of predefined number of allocation.

Alternatively, in another implementation, the BS 101, particularly, the grant allocation system 103 may allocate grants for resource allocation using neural network technique. Particularly, the BS 101 on receiving a Buffer Status Report (BSR) index value from the UE 105 may estimate an optimal resource grant for the requested BSR index based on at least one of UE parameters and network parameters using a pretrained Neural Network (NN) model. The NN may essentially predict the parameters for the predefined allocation mechanism. That is, the NN predicts the value for scaling factor (E) and Iteration Counter (I) as defined in equation 1.

The neural network (NN) may be trained using one or more parameters such as, time, BS identification number, frequency of operation, bandwidth paths, day details, place of location, density of the traffic, distribution of the traffic, climate conditions, occasions, calendar based events, vacation details/distribution, UE information, UE type, Tx and Rx Antenna parameters, beam index, TDD/FDD/Dynamic TDD, UE category, BS/TX mode and monthly package, data type information, holiday related parameters, measurements, offers on release date, one or more events, QoS and QCI (QoS class identifier) and different communication capability information. The neural network model is trained either using instantaneous or offline data associated with plurality of UE's and network.

In an embodiment, the trained neural network model may be implemented using a deep learning (NN) or a Machine Learning (ML) model or Artificial Intelligence (AI) model. Such (NN) may be trained using belief propagation-based algorithm to estimate optimal grant of resources. In an embodiment, the trained neural network may be a software module or hardware module. Such trained neural network may run in CU or DU or RIC or any intelligence module and may be situated in any layer based on implementation and architecture of network. In an embodiment, the neural network may be a Convolution Neural Network (CNN) or Recurrent Neural Network (RNN), or Deep Neural Network (DNN) or sparse CNN or sparse DNN or Sparse RNN or hybrid-based architectures. In an embodiment, ML, AI AND NN are used interchangeably in the present disclosure.

One can derive rule-based formulas using algorithms in the trained module. Further, while estimating the optimal resource grant for the UE 105, the grant allocation system 103 may consider future requirements of the UE 105. In an embodiment, the grant allocation system 103 may assign a penalty in case of detecting wastage of spectrum and network resources. Further, after training the neural network model in a training phase, the neural network model may estimate required transmissions and estimate the grant allocation in each transmission. In an embodiment, the grant allocation from the neural network model may be indicated to the MAC layer via E2 interface. As a result, the estimated grant allocation may be used by the MAC layer for allocating the resources to the UE 105.

Further, feedback from the neural network model may be used by other blocks in the MC. Thereby benefitting overall performance. In an embodiment, the ML/AI models may be implemented in real or near real time systems.

Further, in an embodiment, various split options are available for CRAN/VRAN systems. Based on the split option chosen by an operator, estimated grants values are conveyed to the MAC layer via X2 interface, if the MAC scheduling module is in RRH. In an embodiment, terms such as, BS/RU/RRH/eNodeB/gNodeB are interchangeably used in the disclosure. It is understood that interfaces names may change from one technology to other technology or across various split architectures covered in 3gpp.

Figure 2A:
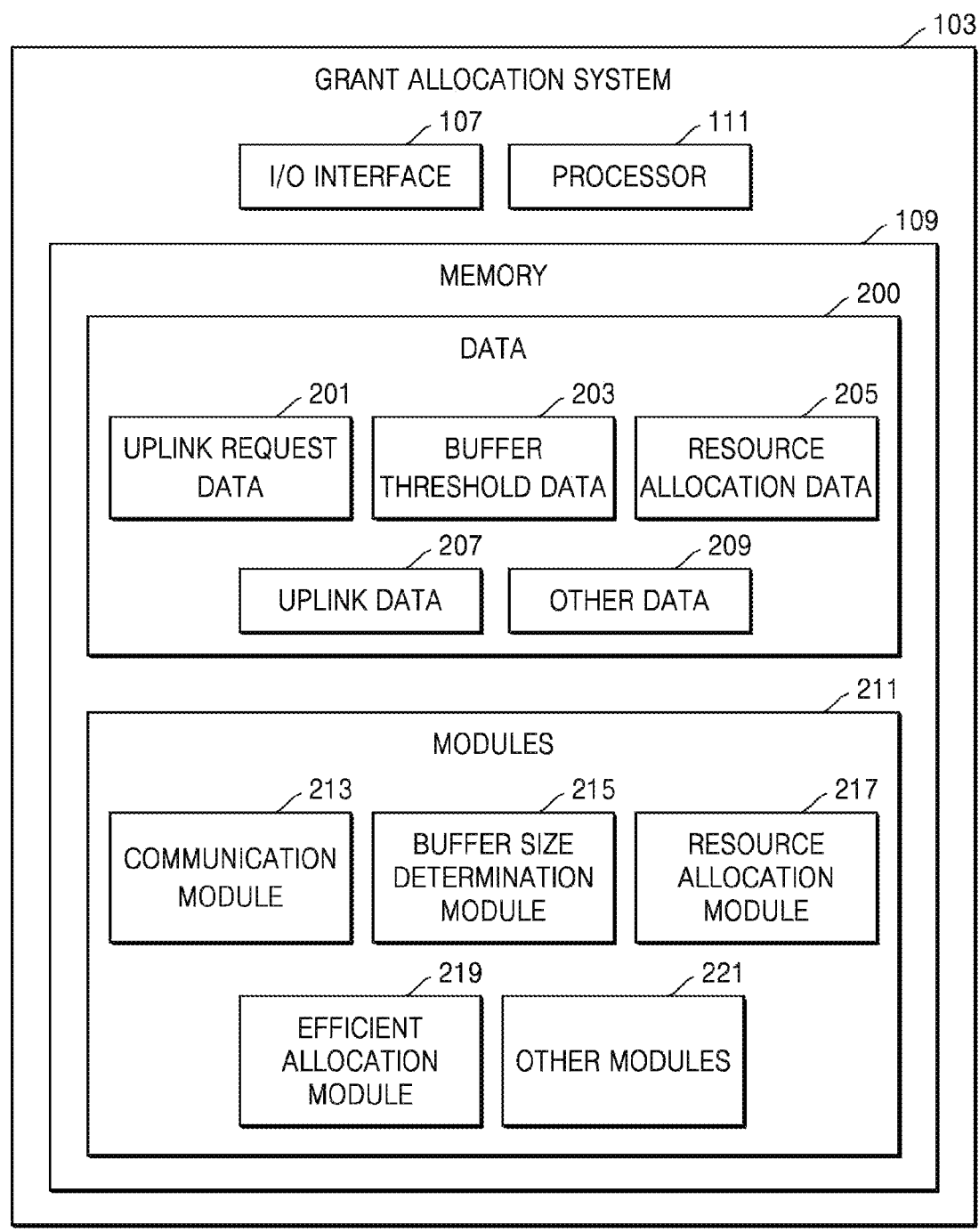
FIG. 2A illustrates a detailed block diagram of a grant allocation system in accordance with some embodiments of the present disclosure.

FIG. 2A illustrates a detailed block diagram of a grant allocation system in accordance with some embodiments of the present disclosure.

The grant allocation system 103 may include data 200 and one or more modules 211 which are described herein in detail. In an embodiment, data 200 may be stored within the memory 109. The data 200 may include, for example, uplink request data 201, buffer threshold data 203, resource allocation data 205, uplink data 207 and other data 209.

The uplink request data 201 may include information about the uplink transmission request of the UE 105. The information may include BSR index value along with the buffer size. In an embodiment, the information may include any other information required for the uplink or downlink transmission request.

The buffer threshold data 203 may include information about the predefined threshold value which is required for comparing with the received buffer size. The predefined threshold value refers to the maximum buffer value corresponding to received BSR index value of (BSR index-n).

The resource allocation data 205 may include information about the resources allocated for the UE 105. The resource allocation data 205 may also include information about the amount of buffer size allocated for the UE 105 for the uplink transmission request.

The uplink data 207 may include the uplink data received from the UE 105 based on the allocated resources. In one embodiment, the uplink data 207 may also include BSR index value for remaining data in the UE 105, along with the uplink data.

The other data 209 may store data, including temporary data and temporary files, generated by modules 211 for performing the various functions of the grant allocation system 103.

In an embodiment, the data 200 in the memory 109 are processed by the one or more modules 211 in the memory 109 of the grant allocation system 103. In an embodiment, the one or more modules 211 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 211 may be communicatively coupled to the processor 111 for performing one or more functions of the grant allocation system 103.

In one implementation, the one or more modules 211 may include, but are not limited to a communication module 213, a buffer size determination module 215, a resource allocation module 217, and an efficient resource allocation module 219. The one or more modules 211 may also include other modules 221 to perform various miscellaneous functionalities of the grant allocation system 103. In an embodiment, the other modules 221 may include a threshold determining module which may determine maximum buffer value corresponding to the received BSR index value.

The communication module 213 may obtain the BSR index value along with the buffer size corresponding to an UL data transmission request from the UE 105. Further, the communication module 213 may receive the uplink data from the UE 105.

The buffer size determination module 215 may determine the buffer size by comparing the buffer size corresponding to the received BSR index value with the predefined threshold value. Based on the comparison, if the buffer size is determined to be less than the predefined threshold value, buffer size determination module 215 may determine allocation of the resources corresponding to maximum buffer size of received BSR index value. Alternatively, if the buffer size corresponding to received BSR index value is determined to be greater than the predefined threshold value, the buffer size determination module 215 may determine allocation of the resources corresponding to maximum buffer size of index value (BSR index-n). For instance, consider the buffer size is "800000" and the requested BSR index value is "180". The predefined threshold value refers to the maximum buffer value corresponding to received BSR index value (BSR index-n), where n is decided to be "1"). In this case, the maximum buffer value corresponding to the BSR index value (BSR-1), i.e., "179" is "774645", which is the threshold value. In such case, the buffer size determination module 215 may compare the buffer size "800000" with "774645" which is the predefined threshold value. Since, the buffer size "800000" corresponding to received BSR index value "180" is determined to be greater than the predefined threshold value "774645", the buffer size determination module 215 may determine allocation of the resources corresponding to maximum buffer size of (BSR index-n), i.e., BSR 179. Likewise, in another instance, resources are required to be allocated for BSR index-n index. However, consider that due to heavy load, the BS 101 may not be able to allocate the resources. In such case, the resource allocation system 101 may allocate lower grant or postpone the grant. This may occur in every step. Further, the resource allocation system 101 using the NN may predict whether to allocate the lower grant or post X slots, where X value can be predicted based on function of QoS and other UE and network wireless parameters. Thus, in an embodiment, the NN may decide the grant based on load conditions. For example, if load is light, or high priority user data or high priority QCI type, then the NN may decide to provide grants such as, n=' 0'. Further, "n" may be selected as n>1 if the load is high or QCI type is low priority type or both. In an embodiment, a centralized scheduler may decide the resource allocation in order to mitigate interference. In an embodiment, static resource grants may be provided, for example, n=3, and the process of allocation may be terminated on identifying the padding bits or identifying maximum iterations.

The resource allocation module 217 may allocate resources to the UE 105 for the uplink data transmission based on the output of the buffer size determination module 215. The resource allocation module 217 allocates resources corresponding to maximum buffer size of (BSR index–n), whenever the buffer size corresponding to the received BSR index value is determined to be greater than the predefined threshold value.

Figure 3A:
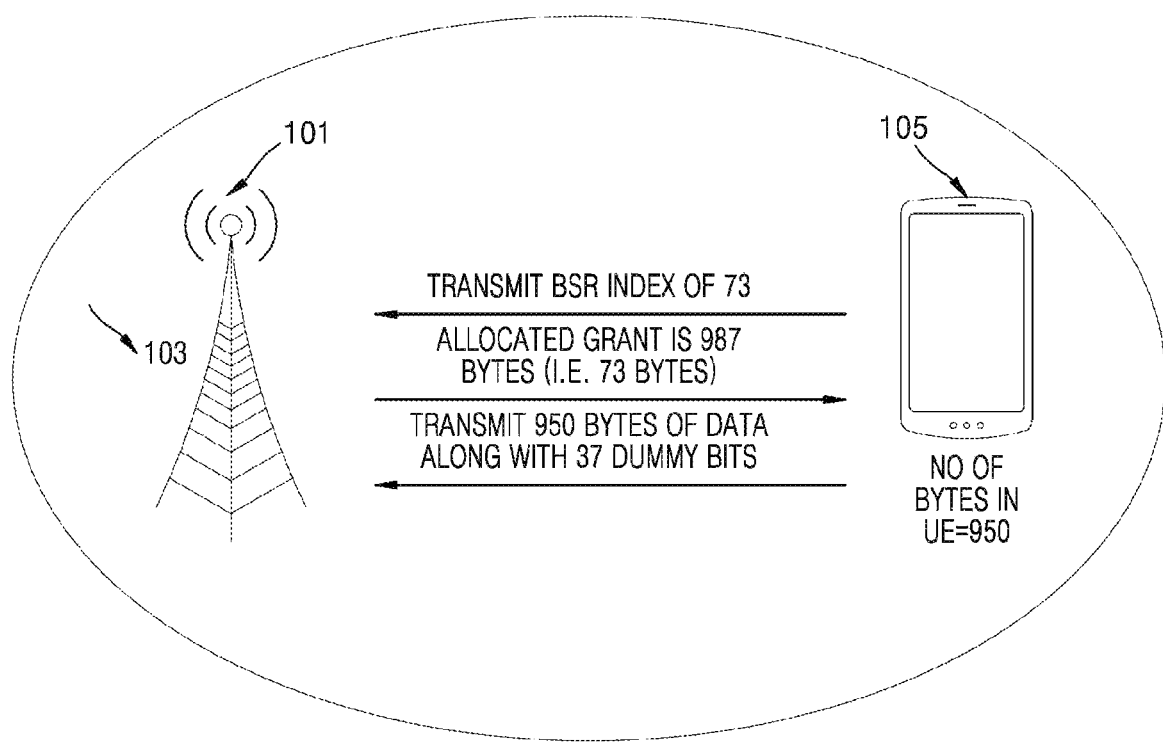
FIG. 3A-3C illustrate exemplary embodiments for efficiently resource based on BSR index in accordance with some embodiments of the present disclosure.

Once the uplink data is received from the UE 105, the efficient resource allocation module 219 may check for padding bits in the uplink data. In case of absence of padding bits, the efficient resource allocation module 219 may allocate resources to the UE 105 subsequently until one of detection of padding bits in the received UL data or detecting maximum allocation of predefined number of allocation. In another embodiment, the uplink data may be received along with the BSR index value for the remaining data from the UE 105. In such case, the efficient resource allocation module 219 may trigger the buffer size determination module 215 to determine the buffer size and allocate the resources until detecting either the buffer size corresponding to the requested BSR index value to be less than the predefined threshold value or on detecting the maximum allocation of predefined number of allocations. FIG. 3A-3C illustrate exemplary embodiments for efficiently allocating grants for resource allocation based on BSR index in accordance with some embodiments of the present disclosure.

Figure 3B:
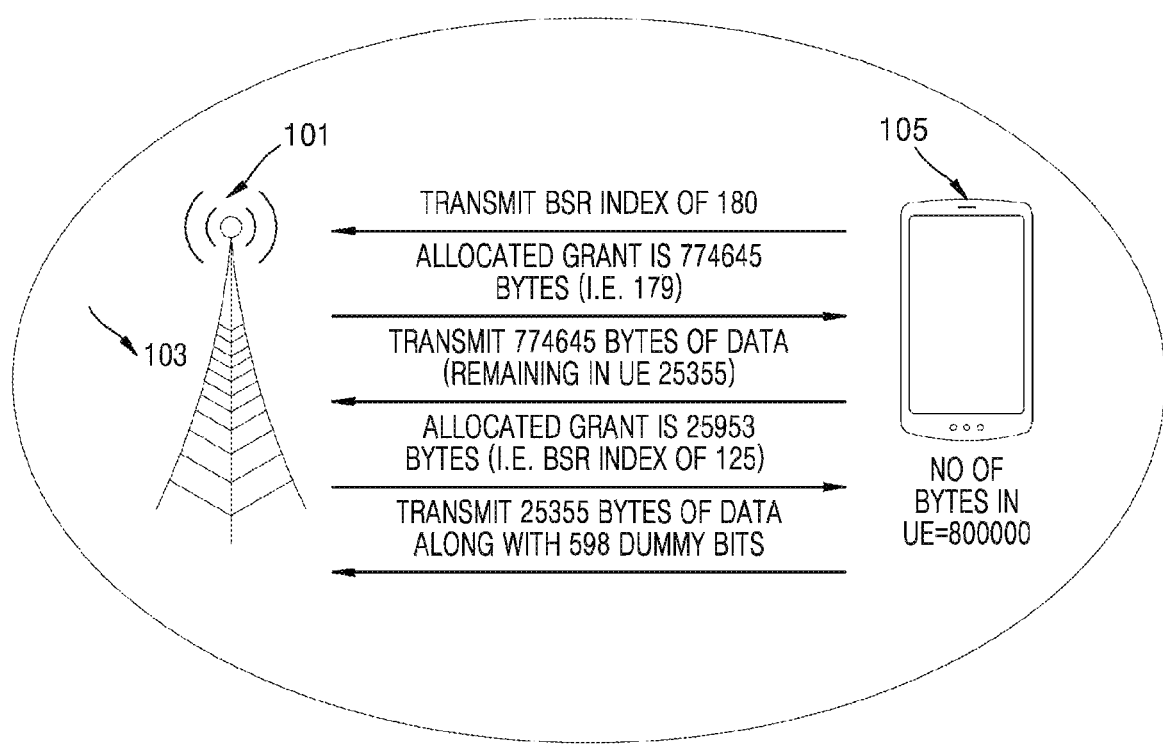
Figure 3C:
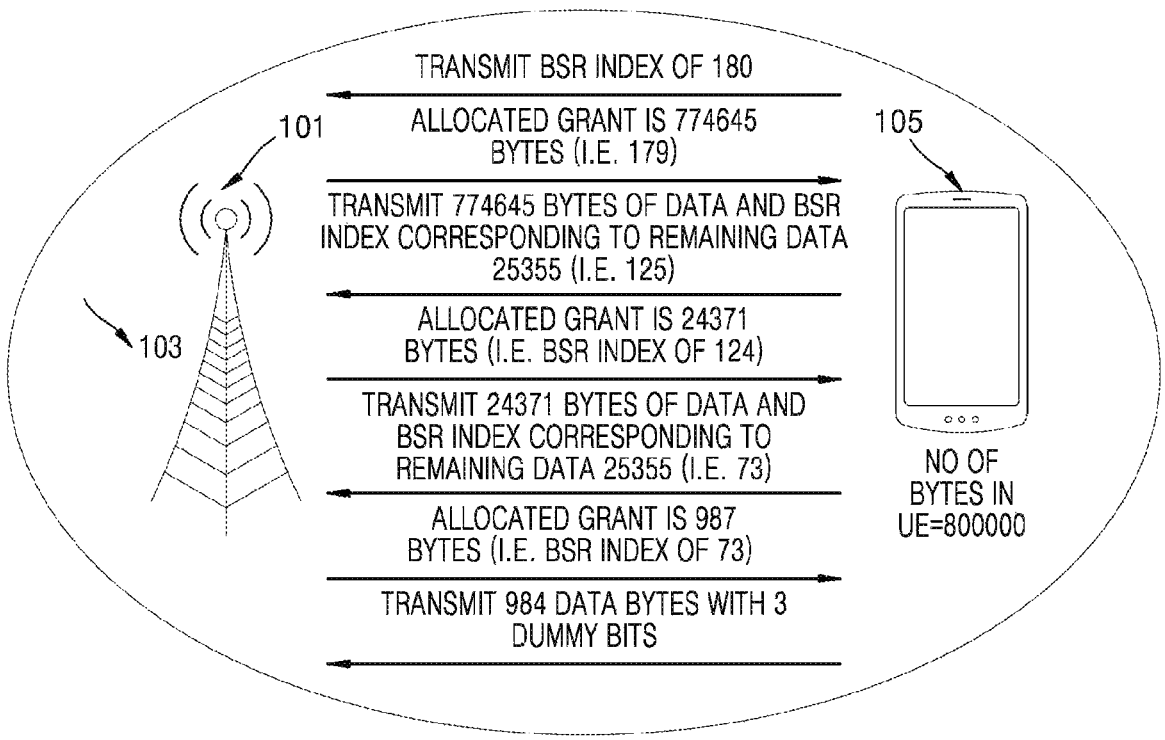

FIG. 3A-3C illustrate exemplary scenarios for efficiently allocating resources based on BSR index. Assume that the buffer index table may be predefined as following table 2.

TABLE 2

| BSR index | Buffer Size (bytes) |
|---|---|
| ... | ... |
| 72 | ≤926 |
| 73 | ≤987 |
| 74 | ≤1051 |
| 75 | ≤1119 |
| ... | ... |
| 124 | ≤24371 |
| 125 | ≤25953 |
| 126 | ≤27638 |
| ... | ... |
| 178 | ≤727427 |
| 179 | ≤774645 |
| 180 | ≤824928 |
| 181 | ≤878475 |

As shown, in FIG. 3A, the UE 105 may transmit a buffer size of "950" with a BSR index value of "73". Since, the buffer size corresponding to BSR index value "73" i.e., "987" is equal to the predefined threshold value, the grant allocation system 103 allocates maximum buffer size i.e., "987" bytes. Thus, the UE 105 transmits 950 bytes of data along with 30 padding bytes.

FIG. 3B-3C show exemplary scenarios when the buffer size corresponding to the received BSR index value is greater than the predefined threshold value. In FIG. 3B, as shown, the UE 105 transmits a UL data transmission request to the grant allocation system 103 with a BSR index of "180" for buffer size "800000". Based on the request, the grant allocation system 103 may determine the allocation by comparing the received buffer size with the predefined threshold value. In this case, the maximum buffer value corresponding to the (BSR index-n), where n=1, index value "179" is "774645", which is the threshold value. The buffer value is determined to be greater than the threshold value. In such case, the grant allocation system 103 allocates the resources to the UE 105 corresponding to a maximum buffer size of (BSR-n with n=1), which is buffer size corresponding to "179", i.e., "774645". Accordingly, the UE 105 transmit "774645" bytes of UL data to the grant allocation system 103. On receiving the UL data, the grant allocation system 103 may check for padding bits or for a condition of maximum allocation. In this case, the grant allocation system 103 determines that no padding bits are added in the UL data and the allocation has not reached the maximum number of allocation. In such case, the grant allocation system 103 performs subsequent allocation by determining the allocated grant based on the ratio of difference between previously requested BSR index (which is 180) and allocated BSR (BSR-1) (which is 179) and the predefined scaling value. The maximum buffer size for previously requested BSR index value 180 is "824928" and for the allocated BSR 179 is "774645". Consider, for example, the scaling factor is "2". The ratio of difference between previously requested BSR index (which is 180) and allocated BSR (BSR-1) (which is 179) is depicted below by equation 2.

Ratio of difference=(The maximum buffer size for previously requested BSR index−the maximum buffer size for allocated BSR index)/scaling factor   (2)

In the aforementioned example, the maximum buffer size for previously requested BSR index 180 is 824928, the maximum buffer size for allocated BSR index 179 is 774645, and scaling factor is 2. Thus the ratio of difference in this case is 25141 obtained by calculating (824928−774645)/2

Based on the obtained value, which is "25141", the grant allocation system 103 provides a subsequent allocation which is nearest to buffer size of "25141", which is for BSR index "125". Thus, the grant allocation system 103 provides allocation of BSR "125" which is "25953". Hence, the UE 105 in such case may transmit the remaining UL data of "25355" along with the padding bits of "598" based on the difference between the allocated buffer size and the remaining buffer size. Hence, on receiving the UL data with the padding bits, the grant allocation system 103 stops the allocation as the UL transmission from the UE 105 is completed.

Similarly, FIG. 3C shows an exemplary scenario when the UE 105 transmit the signalling for BSR index of remaining data along with the UL data. In FIG. 3C, as shown, the UE 105 transmits a UL data transmission request to the grant allocation system 103 with a BSR index of "180" for buffer size "800000". Based on the request, the grant allocation system 103 may determine the allocation by comparing the received buffer size with the predefined threshold value. In this case, the maximum buffer value corresponding to the (BSR index−n, with n=1) index value "179" is "774645", which is the threshold value. The buffer value is determined to be greater than the threshold value. In such case, the grant allocation system 103 allocates the resources to the UE 105 corresponding to a maximum buffer size of (BSR index−n, n=1), which is buffer size corresponding to "179", i.e., "774645". Accordingly, the UE 105 transmit "774645" bytes of UL data to the grant allocation system 103 along with a signalling for BSR index value of "125" for remaining data, i.e., "25355". On receiving the UL data along with the BSR index value of "125" for remaining data, the grant allocation system 103 may further determine the allocation by comparing the received buffer size "25355" with the predefined threshold value. In this case, the maximum buffer value corresponding to the (BSR index−n, n=1) index value "124" is "24371", which is the threshold value. The buffer value is determined to be greater than the threshold value. In such case, the grant allocation system 103 allocates the resources to the UE 105 corresponding to a maximum buffer size of (BSR-1), which is buffer size corresponding to "124", i.e., "24371". Accordingly, the UE 105 transmit "24371" bytes of UL data to the grant allocation system 103 along with a signalling for BSR index value of "73" for remaining data, i.e., "984". On receiving the UL data along with the BSR index value of "73" for remaining data, the grant allocation system 103 may determine the allocation by comparing the received buffer size "984" with the predefined threshold value. In this case, the maximum buffer value corresponding to the BSR index value (BSR−n, with n=1) i.e., "72" is "926", which is the threshold value. The buffer value is determined to be greater than the threshold value. In such case, the grant allocation system 103 allocates the resources to the UE 105 corresponding to a requested buffer size of BSR which is buffer size corresponding to "73". Hence, the UE 105 in such case may transmit the remaining UL data of "984" along with the padding bits of "3" based on the difference between the allocated buffer size and the remaining buffer size. Thus, on receiving the UL data with the padding bits, the grant allocation system 103 stops the allocation as the UL transmission from the UE 105 is completed.

Figure 2B:
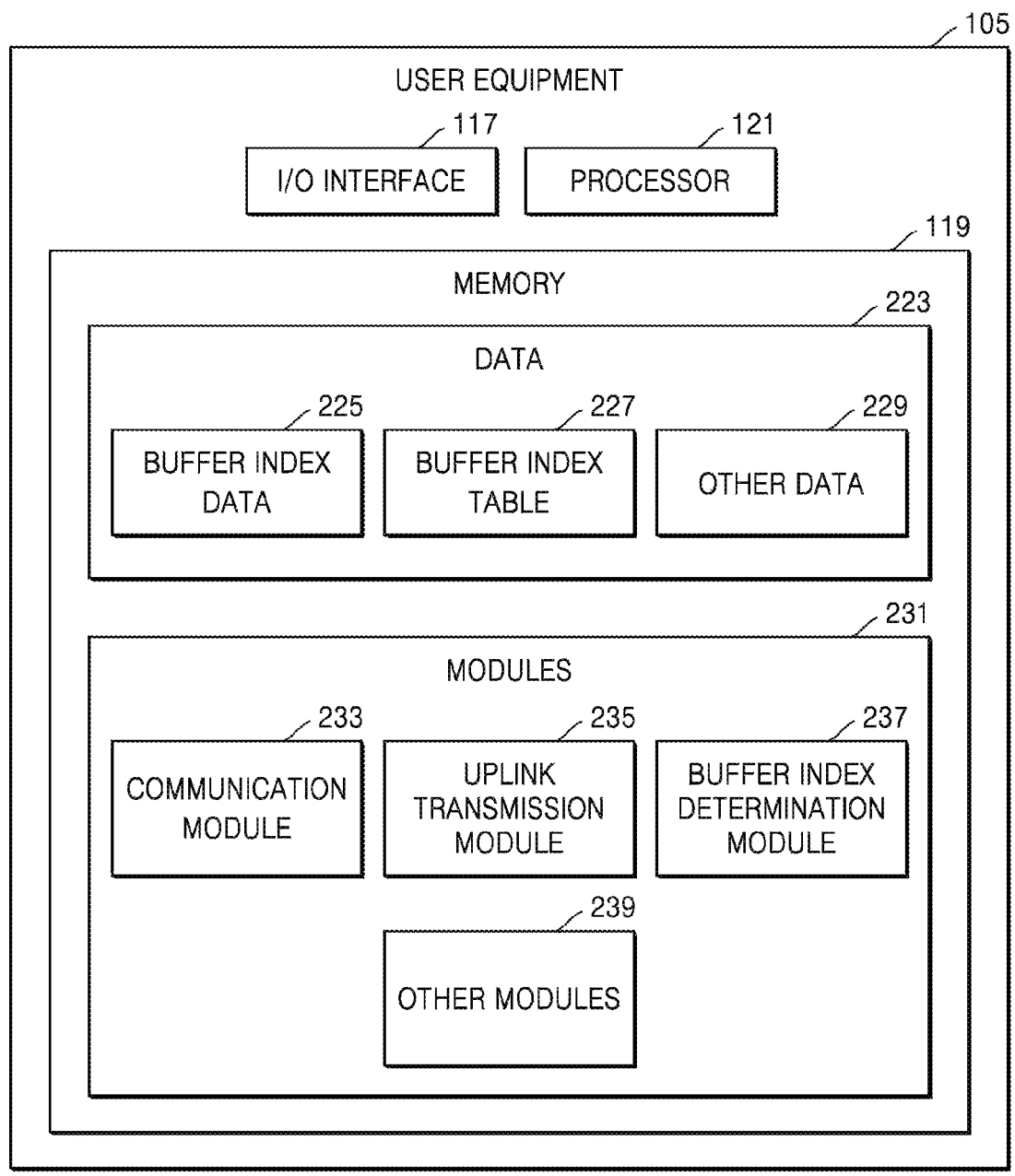
FIG. 2B illustrates a detailed block diagram of a User Equipment (UE) in accordance with some embodiments of the present disclosure.

FIG. 2B shows a detailed block diagram of a User Equipment (UE) in accordance with some embodiments of the present disclosure.

The UE 105 may include data 223 and one or more modules 231 which are described herein in detail. In an embodiment, data 223 may be stored within the memory 119. The data 223 may include, for example, buffer index data 225, buffer index table 227, and other data 229.

The buffer index data 225 may include the buffer size related to the uplink data transmission and the buffer index value corresponding to the buffer size which is to be transmitted.

The buffer index table 227 includes the predefined buffer index table which may be used for determining the index value. The buffer index table 227 may be same as the existing index table.

The other data 229 may store data, including temporary data and temporary files, generated by modules 231 for performing the various functions of the UE 105.

In an embodiment, the data 223 in the memory 119 are processed by the one or more modules 231 present within the memory 119 of the UE 105. In an embodiment, the one or more modules 231 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 231 may be communicatively coupled to the processor 121 for performing one or more functions of the UE 105. The said modules 231 when configured with the functionality defined in the present disclosure will result in a novel hardware.

In one implementation, the one or more modules 231 may include, but are not limited to a communication module 233, an uplink transmission module 235, and a buffer index determination module 237. The one or more modules 231 may also include other modules 239 to perform various miscellaneous functionalities of the UE 105. In an embodiment, the other modules 221 may include a threshold determining module which may determine maximum buffer value corresponding to received BSR index value.

The communication module 233 may obtain the resource allocation from the grant allocation system 103 of the BS 101.

The uplink transmission module 235 may transmit the determined BSR index value along with the with the buffer size corresponding to UL data to the BS 101. Further, the uplink transmission module 235 may also transmit the UL data along with the BSR index value for remaining UL data iteratively until the transmission the UL data is completed.

The buffer index determination module 237 may determine the BSR index value for the buffer size using the predefined buffer index table. For instance, consider the buffer size is "950" bytes, which falls in a range of "926 and 987" corresponding to BSR index value 72 and 73 respectively in the predefined buffer index table. In such case, the buffer index determination module 237 may determine the BSR index value for "950" bytes as "73".

Figure 4A:
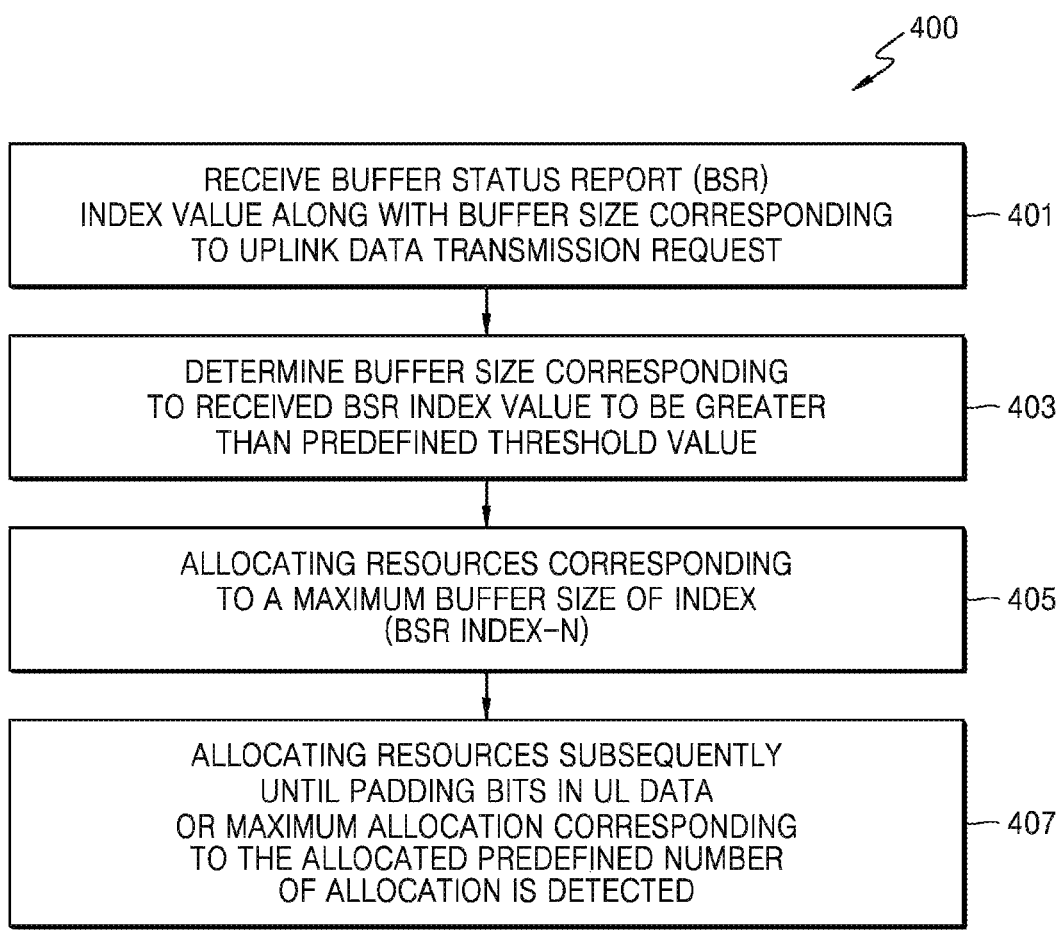
FIG. 4A-4B illustrate flowcharts showing method for efficient allocating resource based on BSR index by base station, in accordance with some embodiments of present disclosure.

FIG. 4A illustrates a flowchart showing a method for efficient allocating grants for resource allocation based on BSR index by base station, in accordance with some embodiments of present disclosure.

As illustrated in FIG. 4A, the method 400 includes one or more blocks for efficient allocating grants for resource allocation based on BSR index. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

In operation 401, the BSR index value is received by the communication module 213 from the UE 105 along with the buffer size corresponding to the UL data transmission request. The BSR index value being determined by the UE 105 based on the buffer size of the UL data.

In operation, the buffer size determination module 215 determines the buffer size corresponding to the received BSR index value to be greater than the predefined threshold value. The determination is performed by comparing the buffer size corresponding to the received BSR index value with the predefined threshold value. In an embodiment, the predefined threshold value refers to the maximum buffer value corresponding to the received BSR index value.

In operation, the resources to the UE 105 are allocated by the resource allocation module 217 corresponding to a maximum buffer size of index (BSR index-n, where n is an integer number greater than or equal to "0".

In operation 407, the resources are allocated by the efficient resource allocation module 219 to the UE subsequently using the predefined allocation mechanism until one of, detection of padding bits in the received UL data and on detecting the maximum allocation of predefined number of allocation. The predefined allocation mechanism includes determining upon receiving the UL data from the UE 105, the buffer size for allocation based on the ratio of difference between previously requested BSR index and the allocated BSR (BSR index-n) and the predefined scaling value. In an embodiment, the predefined scaling value is the integer value.

Figure 5A:
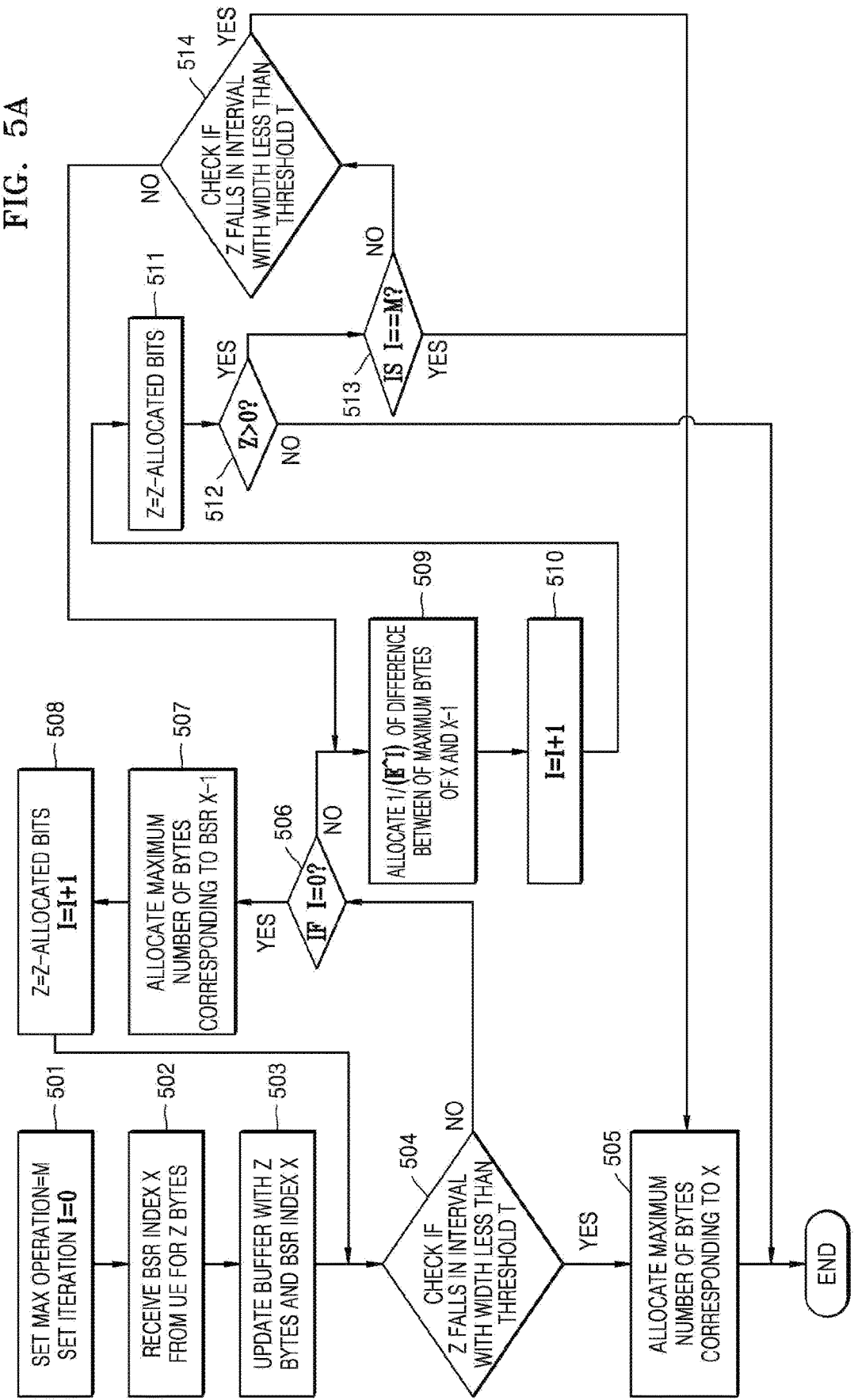
FIG. 5A-5B illustrate exemplary flowcharts for allocating resource based on BSR index in accordance with some embodiments of the present disclosure.
Figure 5B:
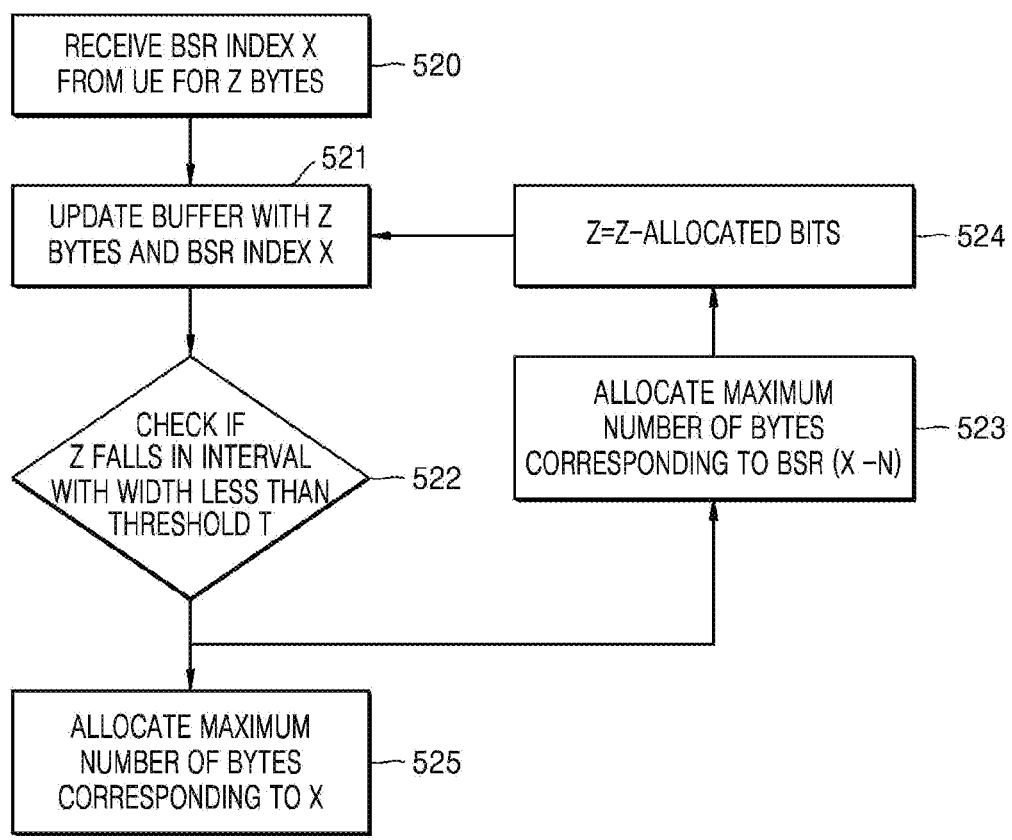

FIG. 5A-5B illustrate an exemplary flowchart for allocating grants for resource allocation based on BSR index in accordance with some embodiments of the present disclosure.

FIG. 5A shows an exemplary flowchart for allocating grants for resource allocation when no signalling from the UE 105 is received along with the UL data. The steps followed by the grant allocation system 103 are defined below.

In operation 501, the maximum number of allocation is defined as "M" and the iteration is set to "0".

In operation 502, the grant allocation system 103 receives the BSR index value, say "X" along with the buffer size, say "Z", from the UE 105.

In operation 503, the grant allocation system 103 updates the received BSR index value with "X" and the buffer size with "Z".

In operation 504, the grant allocation system 103 may check if the buffer size "Z" is within an interval with a width less than the predefined threshold value. In case the buffer size "Z" is within the interval and less than the predefined threshold value, the method moves to operation 505. Alternatively, if the buffer size "Z" is greater than the predefined threshold value, the method moves to operation 506.

In operation block 505, the grant allocation system 103 allocates the maximum number of bytes correcting to the requested BSR, i.e., X.

In operation 506, the grant allocation system 103 may check if the number of iteration for allocation is equal to zero. In case the number of iteration is zero, the method moves to operation 507. Otherwise, the method moves to operation 509.

In operation 507, the grant allocation system 103 allocates maximum number of bytes corresponding to index of (BSR index-n, where n is an integer number greater than or equal to "0".

In operation 508, the grant allocation system 103 updates the buffer size "Z" with difference of "Z" and the allocated bytes and increments the number of iteration to one. Further, the method moves to operation 504.

In operation 509, the grant allocation system 103 allocates subsequent grants based on the ratio of difference between the maximum number of bytes of "X" and "X-n" and scaling factor E.

In operation 510, the grant allocation system 103 updates the number of iteration by one.

In operation 511, the grant allocation system 103 updates the buffer size "Z" with difference of "Z" and the allocated bytes.

In operation 512, the grant allocation system 103 checks if the buffer size "Z" is greater than zero. Particularly, the grant allocation system 103 checks for the dummy bits. In case "Z" is greater than zero, the method moves to block 513. Otherwise, the method ends.

In operation 513, the grant allocation system 103 checks if the number of iterations is reached maximum number of iterations. In case the number of iterations is maximum number of iterations, the method ends. Otherwise, the method moves to operation 514.

In operation 514, the grant allocation system 103 checks if the buffer size "Z" is within the interval with the width less than the predefined threshold value. If yes, the method moves to operation 509. Otherwise, the method end.

FIG. 5B shows an another exemplary flowchart for allocating grants for resource allocation when signalling from the UE 105 is received along with the UL data. The steps followed by the grant allocation system 103 are defined below.

In operation 520, the grant allocation system 103 receives the BSR index value, say "X" along with the buffer size, say "Z", from the UE 105.

In operation 521, the grant allocation system 103 updates the received BSR index value with "X" and the buffer size with "Z".

In operation 522, the grant allocation system 103 may check if the buffer size "Z" is within an interval with a width less than the predefined threshold value. In case the buffer size "Z" is within the interval and less than the predefined threshold value, the method moves to operation 525. Alternatively, if the buffer size "Z" is greater than the predefined threshold value, the method moves to operation 523.

In operation block 523, the grant allocation system 103 allocates maximum number of bytes corresponding to index of (BSR index-n, where n is an integer number greater than or equal to "0".

In operation 524, the grant allocation system 103 updates the buffer size "Z" with difference of "Z" and the allocated bytes and increments the number of iteration to one. Further, the method moves to operation 521.

In operation 525, if the buffer size "Z" is less than the predefined threshold value, the grant allocation system 103 allocates the maximum number of bytes corresponding to "X" and the method end.

Figure 4B:
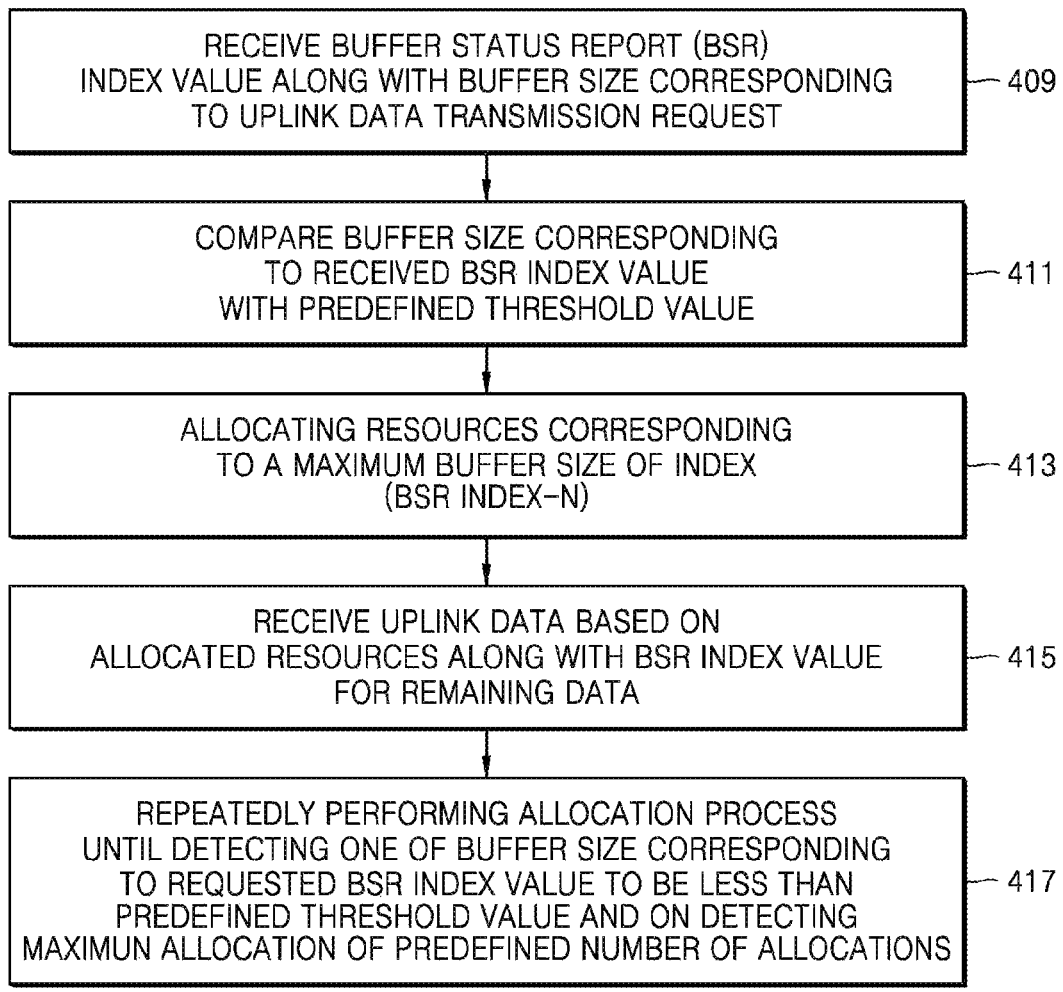

FIG. 4B illustrates a flowchart showing a method for efficient allocating grants for resource allocation based on BSR index by base station in accordance with some embodiments of present disclosure.

In operation 409, the BSR index value is received by the communication module 213 from the UE 105 along with the buffer size corresponding to the UL data transmission request. The BSR index value being determined by the UE 105 based on the buffer size of the UL data.

In operation 411, the buffer size determination module 215 compares the buffer size corresponding to the received BSR index value with the predefined threshold value.

In operation 413, the resources to the UE 105 are allocated by the resource allocation module 217 corresponding to a maximum buffer size of index (BSR index n, where n is a whole number and greater than or equal to "0") on determining the buffer size to be greater than the predefined threshold value.

In operation 415, the UL data is received by the communication module 213 based on the allocated resources along with a BSR index value for the remaining data in buffer.

In operation 417, repeatedly, performing steps of operations 411, 413 and 415 until detecting one of, the buffer size corresponding to the requested BSR index value to be less than the predefined threshold value and on detecting maximum allocation of predefined number of allocations.

Alternatively, in another implementation, the BS 101, particularly, the grant allocation system 103 may allocate grants for resource allocation using neural network technique. Particularly, the BS 101 on receiving a Buffer Status Report (BSR) index value from the UE 105 may estimate an optimal resource grant for the requested BSR index based on at least one of UE parameters and network parameters using a pretrained neural network model. The neural network may be trained using one or more parameters such as, time, BS identification number, frequency of operation, bandwidth paths, day details, place of location, density of the traffic, distribution of the traffic, climate conditions, occasions, calendar based events, vacation details/distribution, UE information, UE type, UE category, Beam index, TX mode, NOMA mode or full duplex mode or NOMA-Full duplex mode, antenna parameters and monthly package, data type information, holiday related parameters, measurements, offers on release date, one or more events, QoS and QCI (QoS class identifier) and different communication capability information. The neural network model is trained either using instantaneous or offline data associated with plurality of UE's and network.

In an embodiment, the trained neural network model may be implemented using a deep learning neural network or a machine learning model or artificial intelligence model. Such neural network may be trained using belief propagation algorithm to estimate optimal grant of resources. In an embodiment, the trained neural network may be a software module or hardware module. Such trained neural network may run in CU or DU or RIC or any intelligence module and may be situated in any layer based on implementation and architecture of network. In an embodiment, the neural network may be a Convolution Neural Network (CNN) or Recurrent Neural Network (RNN), or Deep Neural Network (DNN) or sparse CNN or sparse DNN or Sparse RNN or hybrid-based architectures.

Figure 6:
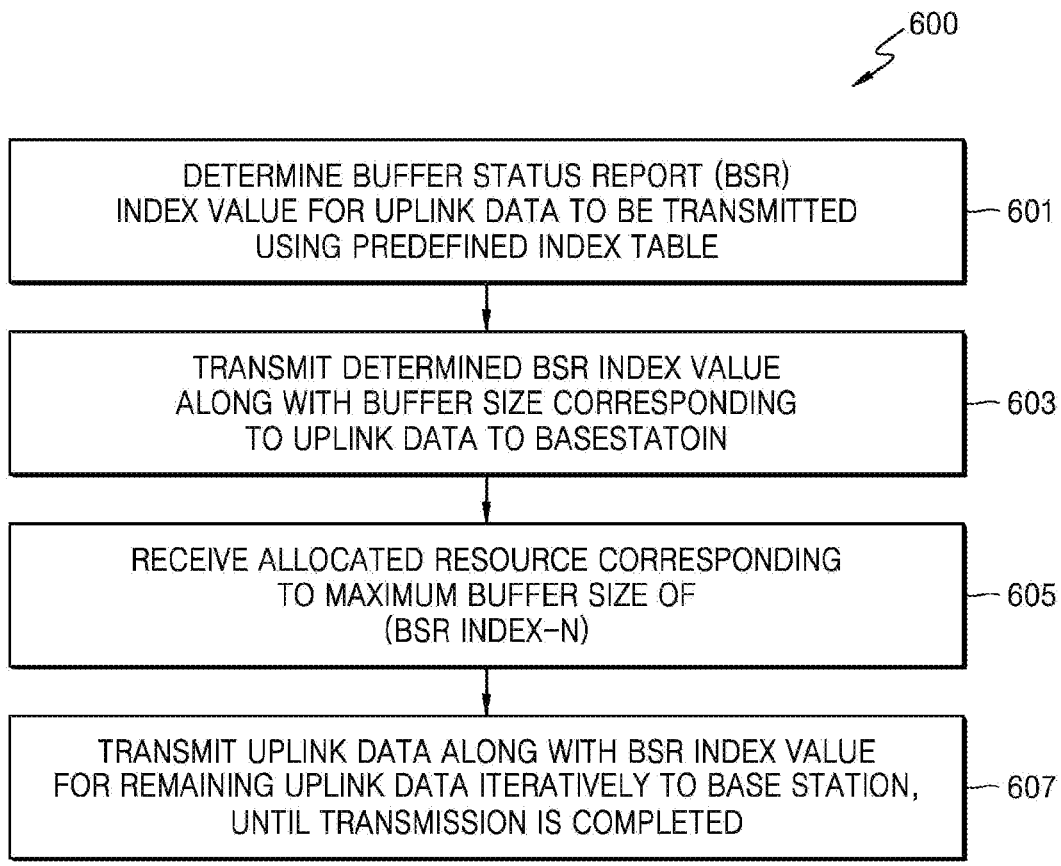
FIG. 6 illustrates a flowchart showing a method for allocating resource allocation based on BSR index by user equipment, in accordance with some embodiments of present disclosure.

FIG. 6 illustrates a flowchart showing a method for allocating grants for resource allocation based on BSR index by user equipment, in accordance with some embodiments of present disclosure.

In operation 601, the Buffer Status Report (BSR) index value is determined by the buffer index determination module 237 for Uplink (UL) data to be transmitted using the predefined buffer index table.

In operation 603, the determined BSR index value is transmitted by the uplink transmission module 235 along with buffer size corresponding to the Uplink (UL) data.

In operation 605, the allocated resource is received by the communication module 233 corresponding to maximum buffer size of (BSR-1).

Figure 7:
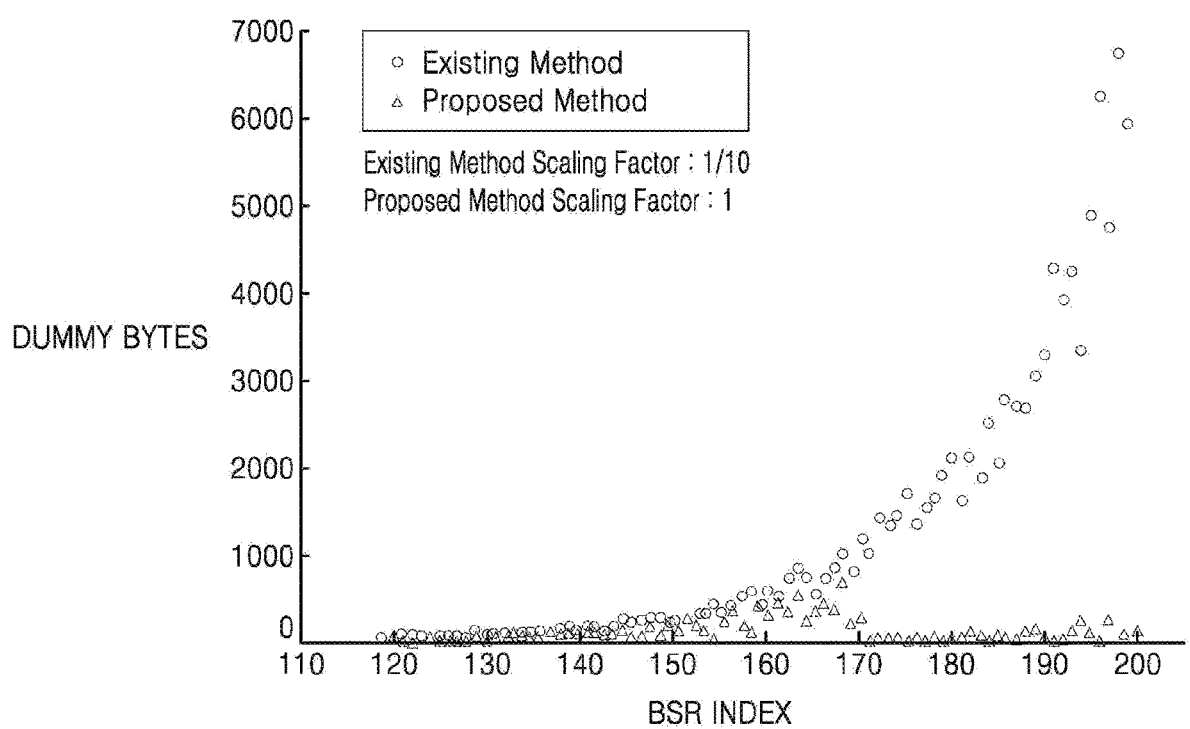
FIG. 7 illustrates exemplary graphs for simulation output for BSR index 121-200 in accordance with some embodiments of present disclosure.

In operation 607, the UL data is transmitted by the uplink transmission module 235 along with the BSR index value for remaining UL data iteratively until the transmission the UL data is completed. FIG. 7 illustrates exemplary graphs for simulation output for BSR index "121-200" in accordance with some embodiments of present disclosure. A BSR index may be predetermined according to the network communication system such as 3rd Generation Partnership Project (3GPP) Long Term Evolution (LTE) systems, and 5th generation communication system (5G NR). Referring to FIG. 7, according to the present disclosure, the amount of dummy bytes is reduced as the BSR index increase.

Figure 8:
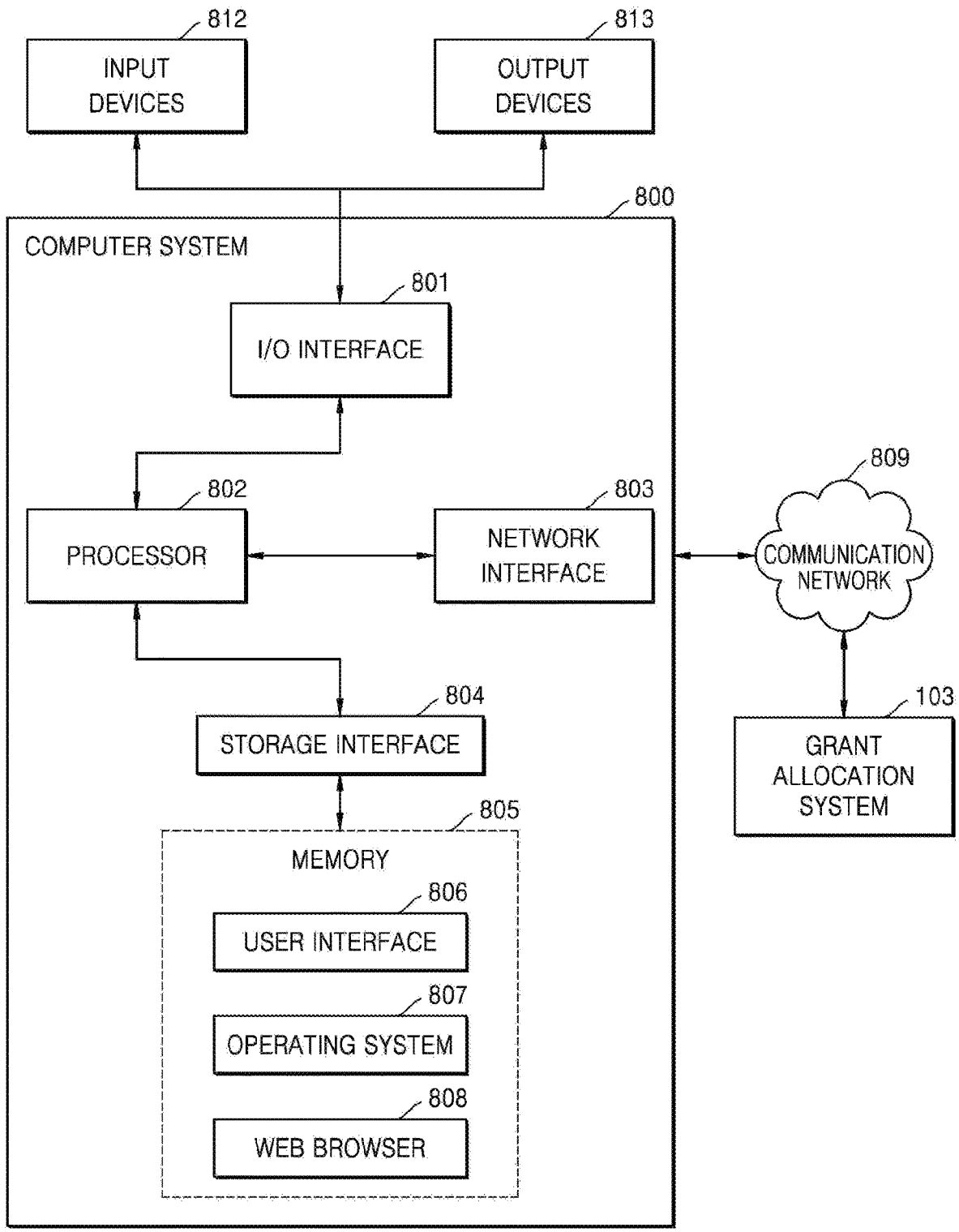
FIG. 8 illustrates a block diagram of an exemplary user equipment for implementing embodiments consistent with the present disclosure.

FIG. 8 illustrates a block diagram of an exemplary user equipment 800 for implementing embodiments consistent with the present disclosure. The user equipment 800 may include a central processing unit ("CPU" or "processor") 802. The processor 802 may include at least one data processor for efficiently allocating grants for resource allocation based on BSR index. The processor 802 may include specialized processing units such as, integrated system (bus) controllers, memory management control units, floating point units, graphics processing units, digital signal processing units, etc.

The processor 802 may be disposed in communication with one or more input/output (I/O) devices (not shown) via I/O interface 801. The I/O interface 801 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 801, the user equipment 800 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor 802 may be disposed in communication with the communication network 809 via a network interface 803. The network interface 803 may communicate with the communication network 809. The network interface 803 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 809 may include, without limitation, a direct interconnection, local area network (LAN), wide area network (WAN), wireless network (e.g., using Wireless Application Protocol), the Internet, etc. Using the network interface 803 and the communication network 809, the user equipment 800 may communicate with grant allocation system 103. The network interface 803 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 809 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 802 may be disposed in communication with a memory 705 (e.g., RAM, ROM, etc. not shown in FIG. 8) via a storage interface 804. The storage interface 704 may connect to memory 705 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 805 may store a collection of program or database components, including, without limitation, user interface 806, an operating system 807 etc. In some embodiments, e user equipment 800 may store user/application data, such as, the data, variables, records, etc., as described in this disclosure. Such databases may be implemented as fault-tolerant, relational, scalable, secure databases such as Oracle or Sybase.

The operating system 807 may facilitate resource management and operation of the user equipment 800. Examples of operating systems include, without limitation, APPLE MACINTOSHR OS X, UNIXR, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLER IOS™, GOOGLER ANDROID™, BLACKBERRYR OS, or the like.

In some embodiments, the user equipment 800 may implement a web browser 808 stored program component. The web browser 808 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browser 608 may utilize facilities such as AJAX™, DHTML™, ADOBE® FLASH™, JAVASCRIPT™, JAVA™, Application Programming Interfaces (APIs), etc. In some embodiments, the user equipment 800 may implement a mail server stored program component. The mail server may be an Internet mail server such as Microsoft Exchange, or the like. The mail server may utilize facilities such as ASP™, ACTIVEX™, ANSI™ C++/C #, MICROSOFT®, NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the user equipment 800 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The present disclosure helps in efficiently allocating and scheduling resource grant based on BSR index value to minimize byte padding. In addition, the present disclosure allows network to save on uplink resource and serve more users by differing BSR grant resources to UE in multiple iterations.

An embodiment of the present disclosure facilitates UE to require lesser power for transmission the same amount of the data when compared to existing transmission techniques.

An embodiment of the present disclosure helps in optimizing the allocated radio resources.

An embodiment of the present disclosure increases overall system throughput since the spectral efficiency is improved.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the disclosure, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the disclosure" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated operations of FIGS. 5A, 5B and 6 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for allocating resource in wireless communication network, the method comprising:
   receiving a buffer status report (BSR) index value from a user equipment (UE) along with buffer size corresponding to an uplink (UL) data transmission request;
   determining the buffer size corresponding to the received BSR index value to be greater than a predefined threshold value;
   allocating resources to the UE corresponding to a maximum buffer size of (BSR index-n), where n is an integer greater than or equal to 0; and
   upon receiving UL data from the UE based on the allocated resources, re-allocating the resources to the UE subsequently until padding bits in the received UL data or maximum allocation of predefined number of allocation is detected,
   wherein, upon receiving the UL data from the UE, the buffer size for re-allocation is determined based on a ratio of difference between previously requested BSR index and allocated BSR index (BSR-n) and a predefined scaling value.

2. The method of claim 1, wherein the BSR index value is determined by the UE based on buffer size of the UL data.

3. The method of claim 1, wherein determining comprises comparing the buffer size corresponding to the received BSR index value with the predefined threshold value.

4. The method of claim 1, wherein allocating the resources to the UE comprises allocating the resources corresponding to maximum buffer size of received BSR index value on determining the buffer size to be less than the predefined threshold value.

5. The method of claim 1, wherein value of "n" is determined based on load on a base station (BS) and the UE and network parameters.

6. The method of claim 1, wherein the predefined threshold value refers to maximum buffer value corresponding to received (BSR-n) index value.

7. The method of claim 1, wherein the predefined scaling value is an integer value.

8. The method of claim 1, the method further comprising estimating an optimal resource grant for the UE for the received BSR index value based on at least one of UE parameters and network parameters using a pretrained machine learning model.

9. The method of claim 8, wherein the pretrained machine learning model is trained using time, BS identification number, frequency of operation, bandwidth paths, day details, place of location, density of traffic, distribution of the traffic, climate conditions, occasions, calendar based events, vacation details/distribution, UE information, UE type, UE category, Beam index, non-orthogonal multiple access/orthogonal multiple access (NOMA/OMA) mode, full duplex mode or half duplex mode or time division duplex (TDD) or frequency division duplex (FDD) mode or dynamic TDD mode and monthly package, data type information, holiday related parameters, measurements, offers on release date, one or more events, quality of service (QoS) and QoS class identifier (QCI) and different communication capability information.

10. A system for allocating resource in wireless communication network, the system comprising:
    a processor; and
    a memory coupled to the processor, wherein the memory stores processor instructions, which, on execution, causes the processor to:
    receive a buffer status report (BSR) index value from a user equipment (UE) along with buffer size corresponding to an uplink (UL) data transmission request;
    determine the buffer size corresponding to the received BSR index value to be greater than a predefined threshold value;
    allocate resources to the UE corresponding to maximum buffer size of (BSR index-n), where n is an integer greater than or equal to 0; and
    upon receiving UL data from the UE based on the allocated resources, re-allocate the resources to the UE subsequently until padding bits in the received UL data or maximum allocation of predefined number of allocation is detected,
    wherein, the processor is further configured to, upon receiving the UL data from the UE, determining the buffer size for re-allocation based on a ratio of difference between previously requested BSR index and allocated BSR index (BSR-n) and a predefined scaling value.

11. The system of claim 10, wherein the BSR index value is determined by the UE based on buffer size of the UL data.

12. The system of claim 10, wherein the processor determines the buffer size by comparing the buffer size corresponding to the received BSR index value with the predefined threshold value.

13. The system of claim 10, wherein the processor allocates the resources to the UE by allocating the resources corresponding to maximum buffer size of received BSR index value on determining the buffer size to be less than the predefined threshold value.

14. The system of claim 10, wherein the predefined threshold value refers to maximum buffer value corresponding to received BSR index value.

15. The system of claim 7, wherein the predefined scaling value is an integer value.

16. The system of claim 10, wherein the processor estimates an optimal resource grant for the UE for the received BSR index value based on at least one of UE parameters and network parameters using a pretrained machine learning model.

* * * * *